US009176620B2

(12) United States Patent (10) Patent No.: US 9,176,620 B2
Ryu et al. (45) Date of Patent: Nov. 3, 2015

(54) MOBILE TERMINAL AND METHOD FOR DISPLAYING INFORMATION LIST THEREOF

(75) Inventors: Hye-Jin Ryu, Seoul (KR); Byoung-Nam Lee, Seoul (KR); Mee-Yeon Choi, Seoul (KR); Joo-Sun Moon, Seoul (KR); Moon-Ju Kim, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 562 days.

(21) Appl. No.: 12/486,341

(22) Filed: Jun. 17, 2009

(65) Prior Publication Data

US 2010/0023858 A1 Jan. 28, 2010

(30) Foreign Application Priority Data

Jul. 22, 2008 (KR) .................. 10-2008-0071219
Jul. 22, 2008 (KR) .................. 10-2008-0071220

(51) Int. Cl.
*G06F 3/048* (2013.01)
*G06F 3/041* (2006.01)
*G06F 3/0482* (2013.01)
*G06F 3/0488* (2013.01)
*H04M 1/247* (2006.01)

(52) U.S. Cl.
CPC ............ *G06F 3/0416* (2013.01); *G06F 3/0482* (2013.01); *G06F 3/04883* (2013.01); *G06F 2200/1614* (2013.01); *H04M 2250/12* (2013.01); *H04M 2250/22* (2013.01)

(58) Field of Classification Search
CPC ................ G11B 27/34; G06F 17/3028; G06F 17/30017; G06F 17/3005
USPC ........................................... 715/864
See application file for complete search history.

(56) References Cited

U.S. PATENT DOCUMENTS 6,662,177 B1 * 12/2003 Martino et al. ............... 1/1
8,245,143 B2 * 8/2012 Yach et al. ................ 715/744
(Continued)

FOREIGN PATENT DOCUMENTS

CN 1524236 A 8/2004
JP 2008-516335 A 5/2008
(Continued)

OTHER PUBLICATIONS

Fragmentation definition retrieved Feb. 8, 2012 from http://encyclopedia2.thefreedictionary.com.*

(Continued)

*Primary Examiner* — Amy M Levy
(74) *Attorney, Agent, or Firm* — Birch, Strewart, Kolasch & Birch, LLP

(57) ABSTRACT

A mobile terminal including a display unit including a touch screen, a memory unit configured to store data, a receiving unit configured to receive an input command to view requested stored data on the display unit of the mobile terminal, and a controller configured to classify the requested stored data into at least first and second categories of data, each category of data including a common type of data, to control the display unit to display the at least first and second categories of data in lists that are parallel with each other, and to individually and separately control the lists of the first and second categories of data based on a touching action performed on one of lists of the first and second categories of data.

16 Claims, 21 Drawing Sheets

(56) References Cited

U.S. PATENT DOCUMENTS

| | | |
|---|---|---|
| 2005/0212749 A1* | 9/2005 | Marvit et al. ............... 345/156 |
| 2006/0026536 A1* | 2/2006 | Hotelling et al. ............ 715/863 |
| 2006/0077183 A1 | 4/2006 | Studt |
| 2006/0112354 A1 | 5/2006 | Park et al. |
| 2006/0238517 A1* | 10/2006 | King et al. ................... 345/173 |
| 2006/0246955 A1 | 11/2006 | Nirhamo et al. |
| 2006/0274060 A1* | 12/2006 | Ni et al. ........................ 345/419 |
| 2007/0046630 A1 | 3/2007 | Hong et al. |
| 2007/0067738 A1* | 3/2007 | Flynt et al. ................... 715/810 |
| 2007/0174010 A1* | 7/2007 | Bhat et al. ....................... 702/66 |
| 2007/0291014 A1* | 12/2007 | Layton et al. ................ 345/173 |
| 2008/0062141 A1 | 3/2008 | Chandhri |
| 2008/0122796 A1* | 5/2008 | Jobs et al. .................... 345/173 |
| 2008/0165152 A1* | 7/2008 | Forstall et al. ............... 345/173 |
| 2008/0195970 A1* | 8/2008 | Rechsteiner et al. ......... 715/810 |
| 2009/0064031 A1* | 3/2009 | Bull et al. .................... 715/784 |
| 2009/0064039 A1* | 3/2009 | Lee et al. ..................... 715/810 |
| 2009/0207184 A1* | 8/2009 | Laine et al. .................. 345/619 |
| 2010/0077002 A1* | 3/2010 | Funch et al. ................. 707/779 |
| 2010/0088639 A1* | 4/2010 | Yach et al. ................... 715/825 |

FOREIGN PATENT DOCUMENTS

| | | |
|---|---|---|
| KR | 2002-0019052 A | 3/2002 |
| KR | 10-2006-0056027 A | 5/2006 |
| KR | 10-0630154 B1 | 10/2006 |
| KR | 10-2007-0041224 A | 4/2007 |
| KR | 10-2007-0113019 A | 11/2007 |
| KR | 10-2007-0120569 A | 12/2007 |
| TW | 200710709 A | 3/2007 |
| WO | WO 2006/092464 A1 | 9/2006 |
| WO | WO2008067811 A1 * | 6/2008 |

OTHER PUBLICATIONS

Defragment definition retrieved Feb. 8, 2012 from http://encyclopedia2.thefreedictionary.com.*

Cohen, E, et al.; "Constraint-Based Tiled Windows"; IEEE Computer Graphics and Applications, IEEE Service Center, New York, vol. 4, No. 5, May 1, 1986, pp. 35-45, XP011155467.

* cited by examiner

FIG. 19
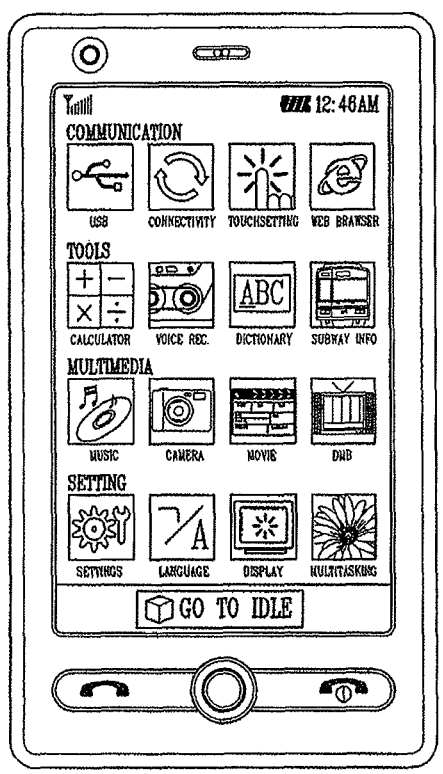
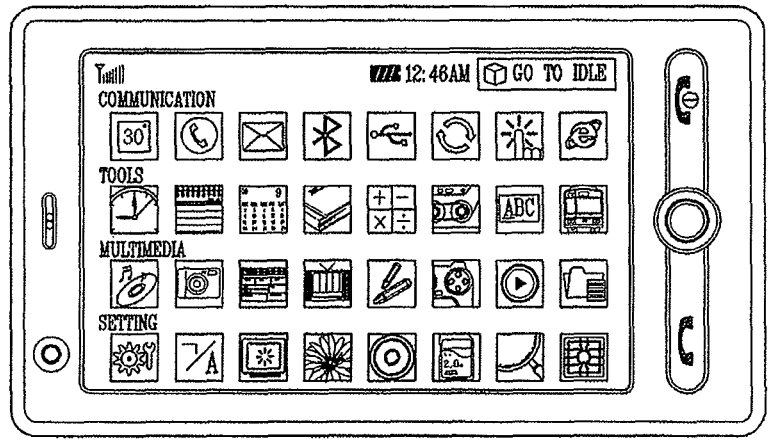

MOBILE TERMINAL AND METHOD FOR DISPLAYING INFORMATION LIST THEREOF

CROSS REFERENCE TO RELATED APPLICATIONS

The present application claims priority to Korean Application No. 10-2008-0071219 filed in Korea on Jul. 22, 2008, and No. 10-2008-0071220 filed in Korea on Jul. 22, 2008 the entire contents of which is hereby incorporated by reference in its entirety.

BACKGROUND OF THE INVENTION

1. Field of the Invention

The present invention relates to a mobile terminal and corresponding method for displaying lists of information stored in the mobile terminal.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. In addition, mobile terminals can also receive broadcast and multicast signals, which permit viewing of content such as videos and television programs.

Efforts are ongoing to support and increase the functionality of mobile terminals. Such efforts include software and hardware improvements, as well as changes and improvements in the structural components which form the mobile terminal. Recently, as touch screens are increasingly applied to terminals, there have been efforts to provide a user interface allowing users to conveniently manipulate menus while minimizing touch manipulations to read information.

SUMMARY OF THE INVENTION

Accordingly, one object of the present invention is to address the above-noted and other problems.

Another object of the present invention is to provide a mobile terminal and corresponding method for displaying information lists discriminated by categories such that they are aligned in parallel.

Another object of the present invention is to provide a mobile terminal and corresponding method for departmentalizing and realigning an information list of a certain category according to a placed position of the terminal.

Still another object of the present invention is to provide a mobile terminal and corresponding method for selectively controlling information lists of each category based on a touch or proximity input.

To achieve these and other advantages and in accordance with the purpose of the present invention, as embodied and broadly described herein, the present invention provides in one aspect a mobile terminal including a display unit including a touch screen, a memory unit configured to store data, a receiving unit configured to receive an input command to view requested stored data on the display unit of the mobile terminal, and a controller configured to classify the requested stored data into at least first and second categories of data, each category of data including a common type of data, to control the display unit to display the at least first and second categories of data in lists that are parallel with each other, and to individually and separately control the lists of the first and second categories of data based on a touching action performed on one of lists of the first and second categories of data.

In another aspect, the present invention provides a method of controlling a mobile terminal, and which includes receiving an input command to view requested stored data on the display unit of the mobile terminal, classifying, via a controller, the requested stored data into at least first and second categories of data, each category of data including a common type of data, displaying, on a display unit including a touch screen, the at least first and second categories of data in lists that are parallel with each other, and individually and separately controlling the lists of the first and second categories of data based on a touching action performed on one of lists of the first and second categories of data.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 19 is an overview of display screens illustrating information lists displayed based on a placed position of a mobile terminal according to yet another embodiment of the present invention.

DETAILED DESCRIPTION OF THE INVENTION

The mobile terminal according to exemplary embodiments of the present invention will now be described with reference to the accompanying drawings.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, the configuration according to the embodiments of the present invention can be also applicable to the fixed types of terminals.

Reference will now be made in detail to the preferred embodiments of the present invention, examples of which are illustrated in the accompanying drawings. A mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

Figure 1:
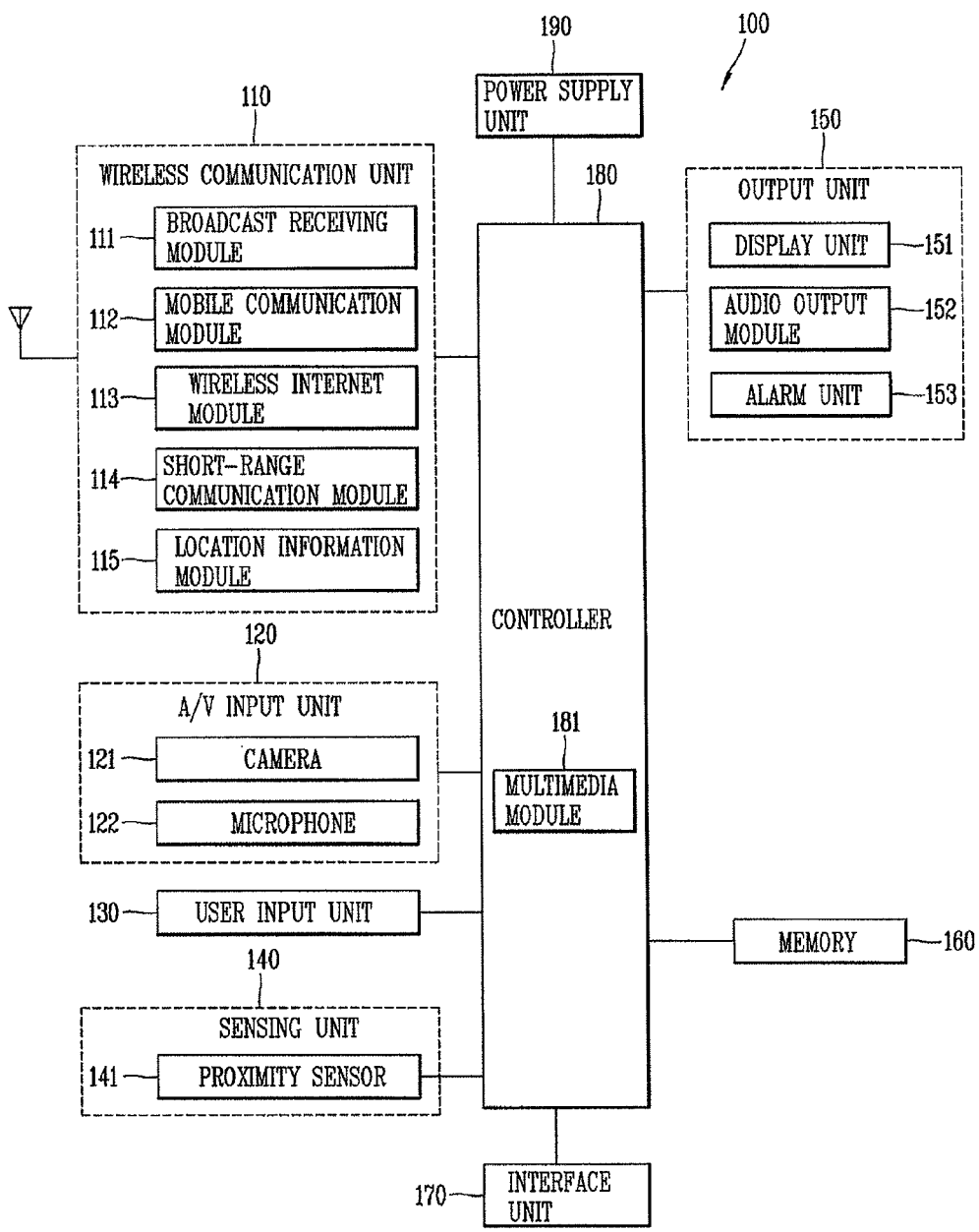
FIG. 1 is a schematic block diagram of a mobile terminal according to an embodiment of the present invention.

FIG. 1 is a block diagram illustrating a mobile terminal according to one embodiment of the present invention. As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but it is understood that implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 may include a Global Position System (GPS) module.

In addition, the GPS module may receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. The A/V input unit 120 may include a camera 121 and a microphone 122. Further, the camera 121 receives and processes image frames of still pictures or video obtained by image sensors in a video call mode or a capturing mode. The processed image frames may then be displayed on a display unit 151 (hereinafter referred to as the display 151).

Also, the image frames processed by the camera 121 may be stored in the memory 160 or transmitted to the exterior via the wireless communication unit 110. Two or more cameras 121 may be provided according to the configuration of the mobile terminal. The microphone 122 may receive an external audio signal via a microphone while the mobile terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen. Further, the sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Here, the sensing unit 140 may include a proximity sensor 141.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 may receive data from an external device, or be provided with power and accordingly transfer the received data or power to each component within the mobile terminal 100 or transfer data of the mobile terminal 100 to an external device. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals and power inputted from the cradle may operate as a signal for recognizing that the mobile terminal 100 has accurately been mounted to the cradle.

The output unit 150 is configured to output an audio signal, a video signal or an alarm signal, and may include the display 151, an audio output module 152, an alarm 153, and the like. Further, the display 151 may output information processed in the mobile terminal 100. For example, when the mobile terminal is operating in a phone call mode, the display 151 provides a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays may be called transparent displays. A representative example of the transparent display may include a Transparent Organic Light Emitting Diode (TOLED), and the like. Further, the mobile terminal 100 may include two or more of such displays 151. For example, the mobile terminal 100 may simultaneously include an external display (not shown) and an internal display (not shown).

Further, the audio output module 152 may output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

In addition, the alarm 153 may output a signal to inform a generation of event associated with the mobile terminal 100. Alarm events may include a call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display 151 or the audio output module 152.

Further, the memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181 which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2 and 3. Further, the mobile terminal may be implemented in a variety of different configurations. Examples of such configurations include a folder type, slide type, bar type, rotating type, swing type or the like. The present description in FIGS. 2 and 3 relates to a slide-type mobile terminal, but the present invention is not limited to the slide-type mobile terminal, and can be applied to other types of terminals including the above-mentioned types of terminals.

Figure 2:
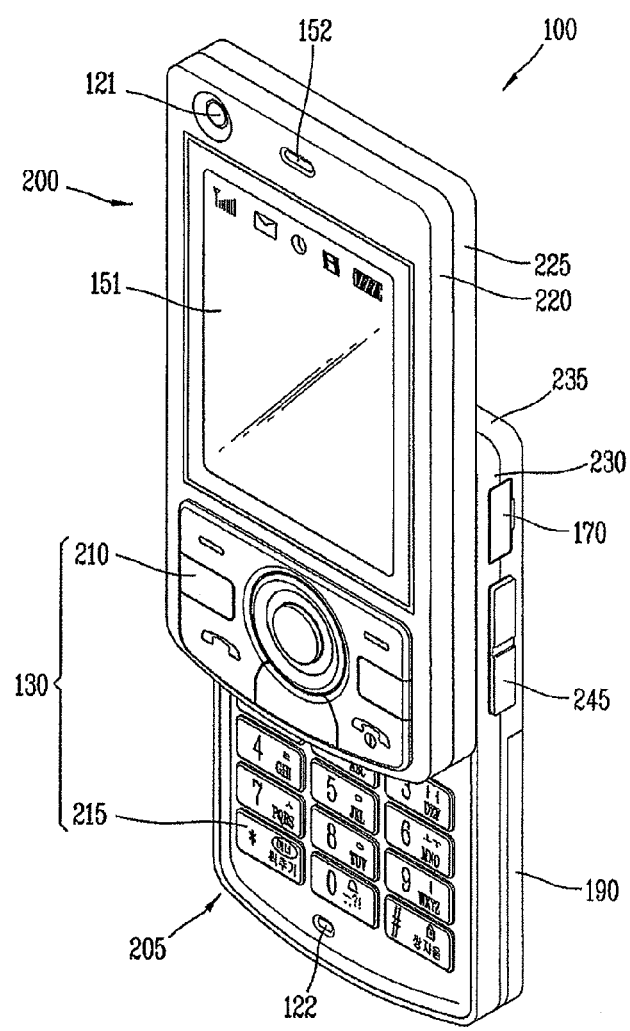
FIG. 2 is a front perspective view of a mobile terminal according to an embodiment of the present invention.

FIG. 2 is a front perspective view of a mobile terminal according to an embodiment of the present invention. As shown, the mobile terminal 100 includes a first body 200, and a second body 205 configured to slidably cooperate with the first body 200 in at least one direction. For a folder-type mobile terminal, the mobile terminal 100 may include the first body 200, and the second body 205 configured to have at least one side folded or unfolded with respect to the first body 200.

Also, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an opened configuration (position). In addition, when the mobile terminal is a folder-type mobile terminal including a first body and a second body having one side folded or unfolded with respect to the first body, the folded state of the second body can be referred to as the closed configuration, whereas the unfolded state of the second body can be referred to as the open configuration.

In addition, when the mobile terminal is a swing-type mobile terminal including a first body and a second body capable of being swung with respect to the first body, the state that the first body is overlapped with the second body can be referred to as the closed configuration whereas the state that the second body is swung thus to make the first body partially exposed can be referred to as the open configuration. Also, even though a specific description is not given of the folder-type mobile terminal and the swing-type mobile terminal with respect to FIGS. 2 and 3, it can be easily understood by those skilled in the art and thus a detailed description thereof will not be repeated.

In addition, the mobile terminal may be operable in a standby (idle) mode when in the closed configuration, but this mode can be released by the user's manipulation. Also, the mobile terminal may be operable in an active (phone call) mode in the open configuration. This mode may also be changed into the idle mode according to the user's manipulation or after a certain time elapses. As shown in FIG. 2, a case (housing, casing, cover, etc.) forming the outside of the first body 200 is formed by a first front case 220 and a first rear case 225. In addition, various electronic components may be disposed in a space between the first front case 220 and the first rear case 225. One or more intermediate cases may additionally be disposed between the first front case 220 and the first rear case 225.

Further, the cases can be formed of resin in a manner of injection molding, or formed using metallic materials such as stainless steel (STS) and titanium (Ti). Also, a display 151, an audio output module 152, a camera 121 or a first user input unit 210 may be disposed at the first front case 220 of the first body 200. In addition, the display 151 may include LCD, OLED, and the like, which can visibly display information. The display 151 and a touchpad can also be layered with each other such that the display 151 can be configured to function as a touch screen so as to allow a user to input information in a touching manner.

Further, the audio output module 152 may be implemented as a speaker, and the camera 121 may be implemented to be suitable for a user to capture still images or video. In addition, like the first body 200, a case configuring the outside of the second body 205 may be formed by a second front case 230 and a second rear case 235. Also, the second user input unit 215 may be disposed at the second body 205, and in more detail, at a front face of the second front case 230. A third user input unit 245, a microphone 122 and an interface unit 170 may also be disposed either at the second front case 230 or at the second rear case 235.

Further, the first to third user input units 210, 215 and 245 may be referred to as a user input unit 130. Any tactile manner that a user can touch, e.g., the display 151, for manipulation can be employed for the user input unit 130. For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 can be used for inputting commands such as START, END, SCROLL or the like, and the second user input unit 215 can be used for inputting numbers, characters, symbols, or the like. The first user input unit 210 may also include so-called soft keys used in cooperation with icons displayed on the display module 151, and navigation keys (usually composed of four navigation keys and a central key) for indicating and confirming an orientation. Also, the third user input unit 245 can be operated as a hot key for activating a specific function within the mobile terminal, and the microphone 122 may be implemented to be suitable for receiving user's voice or various sounds.

In addition, the interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a BLUETOOTH port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like. The power supply 190 may be disposed at a side of the second rear case 235 to provide power to the mobile terminal, and may be a rechargeable battery, for example, to be attachable/detachable for charging.

Figure 3:
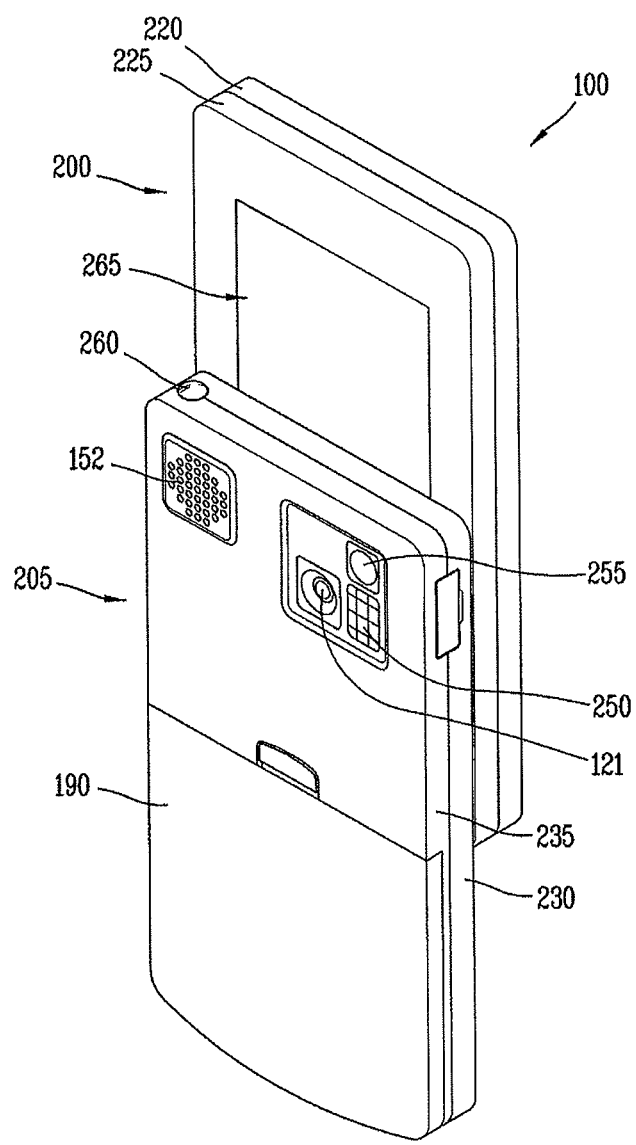
FIG. 3 is a rear perspective view of a mobile terminal according to an embodiment of the present invention.

Next, FIG. 3 is a rear perspective view of the mobile terminal according to an embodiment of the present invention. As illustrated in FIG. 3, a camera 121 may further be disposed at a rear face of the second rear case 235 of the second body 205. In addition, the camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use. Also, a flash 250 and a mirror 255 may additionally be disposed adjacent to the camera 121 of the second body 205. The flash 250 operates in conjunction with the camera 121 of the second body 250 when taking a picture using the camera 121 of the second body 205. In addition, the mirror 255 can cooperate with the camera 121 of the second body 205 to allow a user to photograph himself in a self-portrait mode.

The second rear case 235 may further include an audio output module 152. Also, the audio output module 152 of the second body 205 can cooperate with the audio output module 152 of the first body 200 to provide stereo output. In addition, the audio output module 152 may be configured to operate as a speakerphone. A broadcast signal receiving antenna 260 may also be disposed at one side of the second rear case 235, in addition to an antenna for communications. The antenna 260 can be configured to retract into the second body 205. One part of a slide module 265 which allows the first body 200 to be slidably coupled to the second body 205 may be disposed at the first rear case 225 of the first body 200.

Further, the other part of the slide module 265 may be disposed at the second front case 230 of the second body 205, such that it may not be exposed to the exterior as illustrated in the drawing of the present invention. As such, it has been described that the camera 121 is disposed at the second body 205; however, the present invention may not be limited to the configuration. For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may also be configured to operate within a communication system which transmits data via frames or packets, including both wireless and wireline communication systems, and satellite-based communication systems. Hereinafter, a communication system within which the mobile terminal related to the present invention can operate will be described with reference to FIG. 4. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
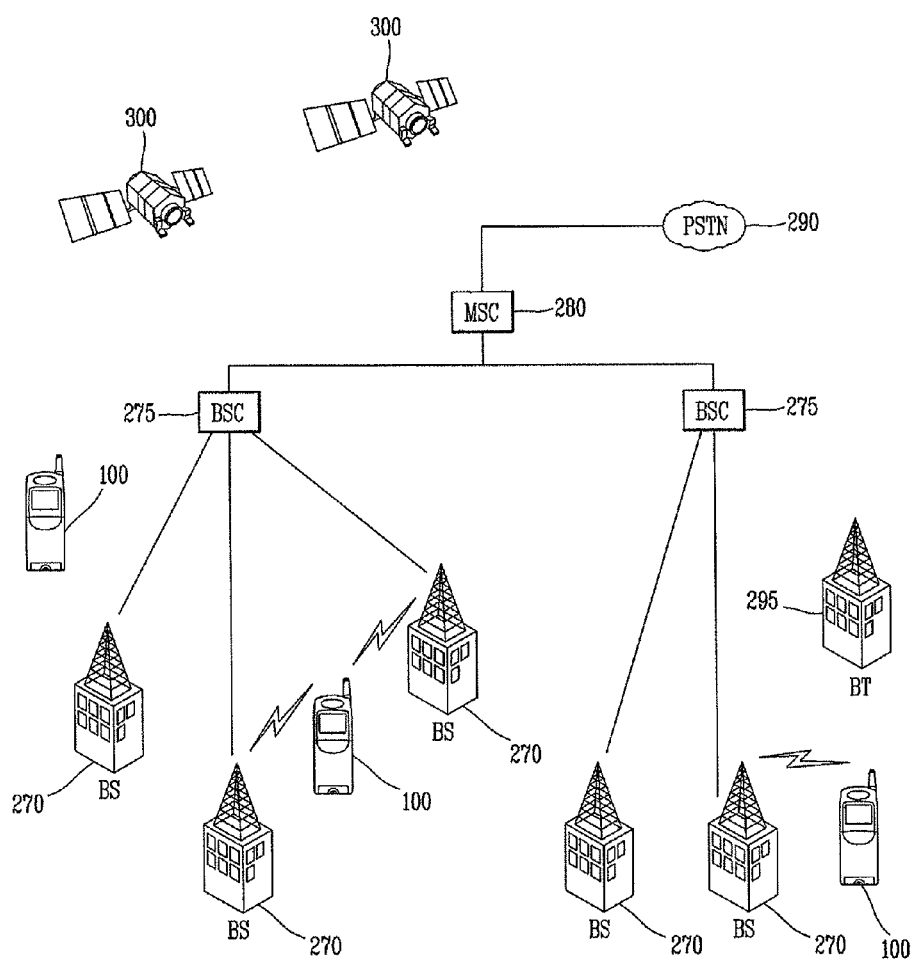
FIG. 4 is a block diagram of a wireless communication system with which a mobile terminal according to an embodiment of the present invention is operable.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as cell sites. A broadcasting transmitter (BT) 295, as shown in FIG. 4, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) can also be configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Figure 5:
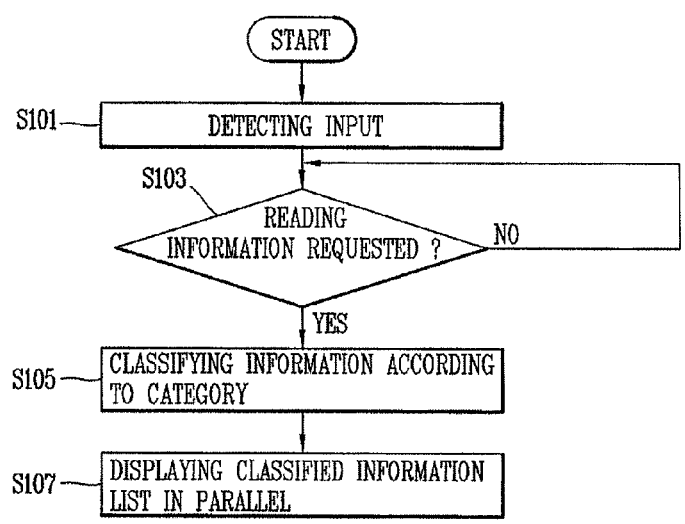
FIG. 5 is a flow chart illustrating a method for displaying an information list of a mobile terminal according to an embodiment of the present invention.

Next, FIG. 5 is a flow chart illustrating a method for displaying an information list of a mobile terminal according to an embodiment of the present invention. With reference to FIG. 5, when an input is generated by a user, the sensing unit 104 detects the input and informs the controller 180 (S101). Namely, the user can input a desired control command by manipulating the user input unit 130 or the touch screen.

The controller 180 then checks whether the user input is an input for reading (e.g., browsing, searching, viewing, displaying) information (S103). The controller 180 also checks whether the received user input is an execution command of a function related to information reading. For example, the controller 180 checks whether a certain menu or function for reading information such as a phone book or a multimedia storage box is selected through menu manipulation. Here, the multimedia storage box includes stored information such as photos, video, music, and the like.

If the user input is a request for reading information (Yes in S103), the controller 180 reads corresponding information stored in the terminal from the memory 160 and classifies the information by categories (S105). For example, if the multimedia storage box is executed, the controller 180 reads the multimedia information such as photos, video, music, and the like stored in the multimedia storage box and classifies them into categories such as image information, music information, and the like.

Further, the controller 180 may classify the information according to information types or by using grouping information of the information. In particular, the information types may be divided into photos, video, contents, documents, music, slides, and the like, and the grouping information may include a group name, an information list of each group, a storage position (e.g., address) of the memory 160 in which data information is stored, and the like. In addition, the information may be grouped by the categories or arbitrarily grouped by the user.

The controller 180 then outputs and displays the list of information (referred to as an information list) classified by the categories to the display unit 151 (S107). That is, the display 151 displays the information list classified into at least two or more different categories under the control of the controller 180. Also, the entire screen of the display 151 is divided into at least two or more display regions, and the information list of corresponding category is displayed on each divided display region. For example, the controller 180 discriminates information into a music file and an image file and displays a music file list in one row and a video and photo file list in another row in parallel to the music file list.

The controller 180 can also display the information list in a list form or in a thumbnail (preview) form. In addition, the controller 180 can implement the information list in various display forms using a 3D graphic effect. For example, the information list display form may be implemented by applying such effect that the user turns the pages of a book or may be implemented in a circulation form by applying such effect that a water mill spins (e.g., cylindrical rotation type).

Thereafter, when an input such as a touch or proximity input is detected on an information list of one category among the displayed information lists of categories, the sensing unit 140 detects the input and generates a corresponding sensing signal. Then, upon receiving the sensing signal, the controller 180 checks a type of the detected input. If the detected input is a flicking or dragging operation, the controller 180 selectively (separately) controls the information list of the corresponding category according to the detected input. Here, in a state that a focus is fixed, the controller 180 rolls items positioned within the focus according to the flicking or dragging operation, sends them back by one step or level, and scales down the size of the corresponding items.

In addition, the focus refers to a position at which items constituting the information list are stopped while they are rolling. The controller 180 also determines a rolling direction of the items of the information list according to a flicking direction or dragging direction, and determines a rolling distance of the information list based on a drag distance or the amount of rolling of the information list whenever the dragging operation is detected. In addition, the controller 180 can adjust a rolling speed of the information list according to a drag speed or drag distance.

In addition, when desired information is reached while reading the information list by the input such as a flicking or dragging operation, the user may select a corresponding item. The controller 180 can also reproduce corresponding information or display the information on the display screen. Namely, when the particular information is selected from the information list displayed on the display screen by the user, the controller 180 outputs the selected information to the output unit 150.

Figure 6:
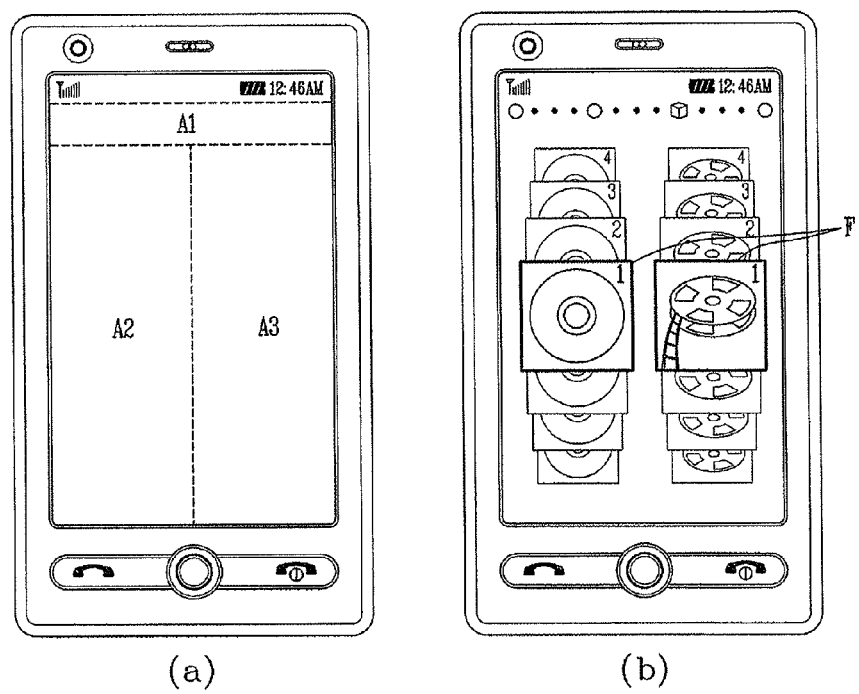
FIG. 6 is an overview of display screens illustrating an information list of a mobile terminal according to an embodiment of the present invention.

Next, FIG. 6 is an overview of display screens illustrating an information list of the mobile terminal according to an embodiment of the present invention. As shown in FIG. 6(*a*), when reading information is requested by the user, the controller 180 configures the screen image of the display 151 to display information. In other words, the controller 180 divides the display screen into at least two or more display regions. For example, in FIG. 6(*a*), the controller 180 divides the screen image of the display 151 into three display regions (A1 to A3).

With reference to FIG. 6(*b*), information lists of corresponding categories are displayed on the divided display regions (A1 and A2), respectively. The controller 180 can also display a scroll mechanism such as a scroll bar or a scroll button on the first display region A1 to scroll in a horizontal direction, and display information lists of different categories (e.g., groups) on the second and third display regions A2 and A3. In a state that focuses (F) are fixed to portions of the screen, the controller 180 positions particular items of the information list within the focuses (F). The items positioned within the focuses (F) may also be changed by an operation such as flicking or dragging.

The controller 180 also displays the other remaining items such that they are arranged stepwise based on the items positioned at the focuses (F), and in this instance, the respective items are disposed to partially overlap with the other adjacent items. In addition, the controller 180 can provide a perspective by reducing the size of the items as the items goes back by one step or level based on the focused items. The controller 180 can also display types of information by using a reproduction button, a camera image, a microphone image, a CD image (shape), and the like, when displaying the information type.

Figure 7:
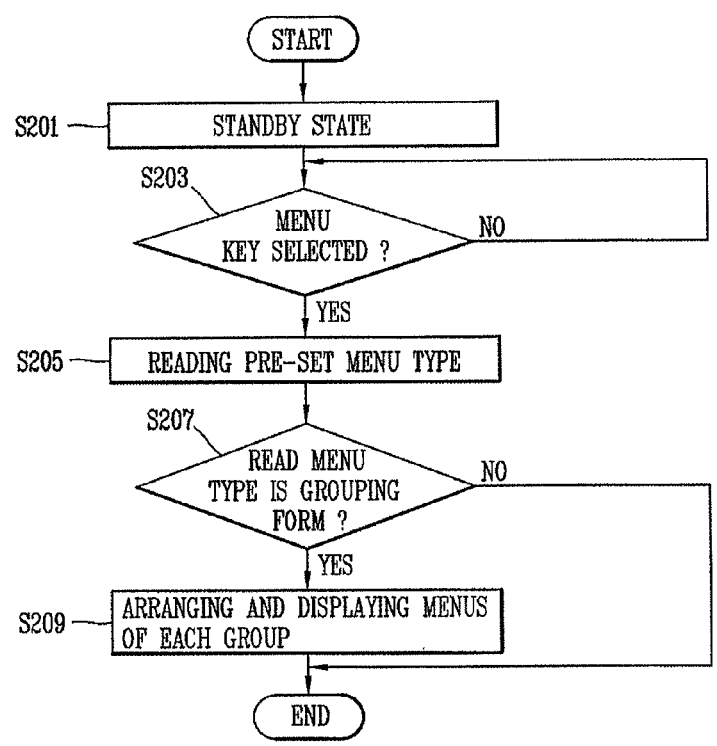
FIG. 7 is a flow chart illustrating a method for displaying an information list of a mobile terminal according to another embodiment of the present invention.
Figure 8:
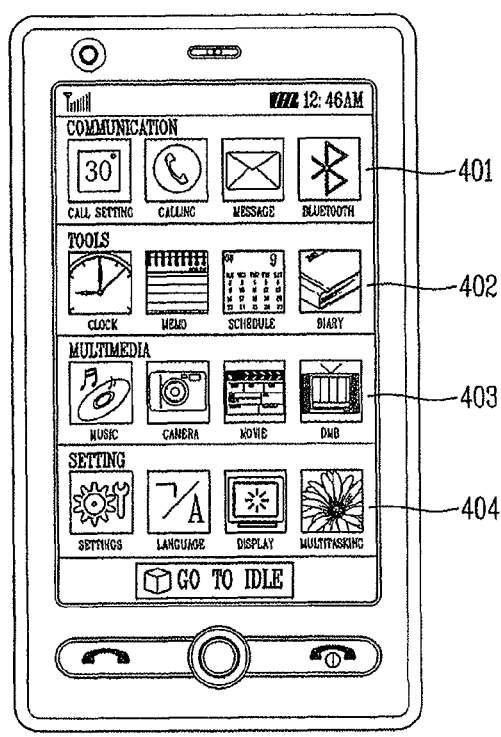
FIG. 8 is an overview of a display screen illustrating menus classified by categories according to an embodiment of the present invention.

Next, FIG. 7 is a flow chart illustrating a method for displaying an information list of a mobile terminal according to another embodiment of the present invention, and FIG. 8 is an overview of a display screen illustrating menus classified by categories according to an embodiment of the present invention. As shown, when the user attempts to manipulate the mobile terminal, the controller 180 displays a standby screen image on the screen of the display unit 151, and waits until data is input by the user (S201). For example, if the terminal is a slide type mobile terminal 100 as shown in FIG. 2, and when the first body 200 is slid along one direction of the second body 205, the controller 180 outputs a standby screen image on the display screen and waits until an external input is generated.

With the display screen image displayed on the display 151, and when an external input occurs such as a proximity touch, a contact touch, a manipulation of the user input unit 130, and the like, the controller 180 checks whether a menu key is selected by the generated external input (S203). When the menu key is selected (Yes in S203), the controller 180 reads or accesses pre-set information related to a menu type or view from the memory 160 (S205). Here, the menu type may be a value previously set by the user or set as default and may include a list, a grid, grouping, and the like.

In addition, the list refers to displaying menu items in a text form such that they are arranged in one direction, and the grid refers to disposing menu items of an icon form in a board-like shape. Also, the grouping refers to classifying menu items by the categories (e.g., communication, tool, multimedia, setting, and the like) and displaying menu lists by the categories. In this embodiment, the menu items are classified and grouped by the categories is taken as an example, but the menu items may be grouped by the user. For example, the user can classify menus into a frequently used menu, a menu not in use, a menu which is used once in a while, and the like and group them.

Further, if the read menu type is the grouping type, the controller 180 divides the display screen into one or more display regions according to the pre-set menu types, and displays the menu items by group on the divided display region such that they are arranged (S207, S209). For example, as shown in FIG. 8, when the menus are discriminately grouped by the categories, the controller 180 displays the menu lists by the categories in parallel. Namely, with the menus discriminately grouped as communication, tool, multimedia and setting, the communication-related menus are arranged and displayed at a first display region 401, tool-related menus are arranged and displayed at a second display region 402, multimedia-related menus are arranged and displayed at a third display region 403, and setting-related menus are arranged and displayed at a fourth display region 404.

The controller 180 can also display the items in the form of icons or images and/or text or menu names. In addition, the controller 180 can display one of a main menu title, a category name, and a group name, and display a grouped menu list. If the menu type read in step S207 in FIG. 7 is not a grouping type (No in S207), the controller 180 displays menus based on pre-set menu type setting information. For example, if the grid type has been set as a menu type, the controller 180 displays the menus in a board-like shape on the display screen.

Figure 9A:
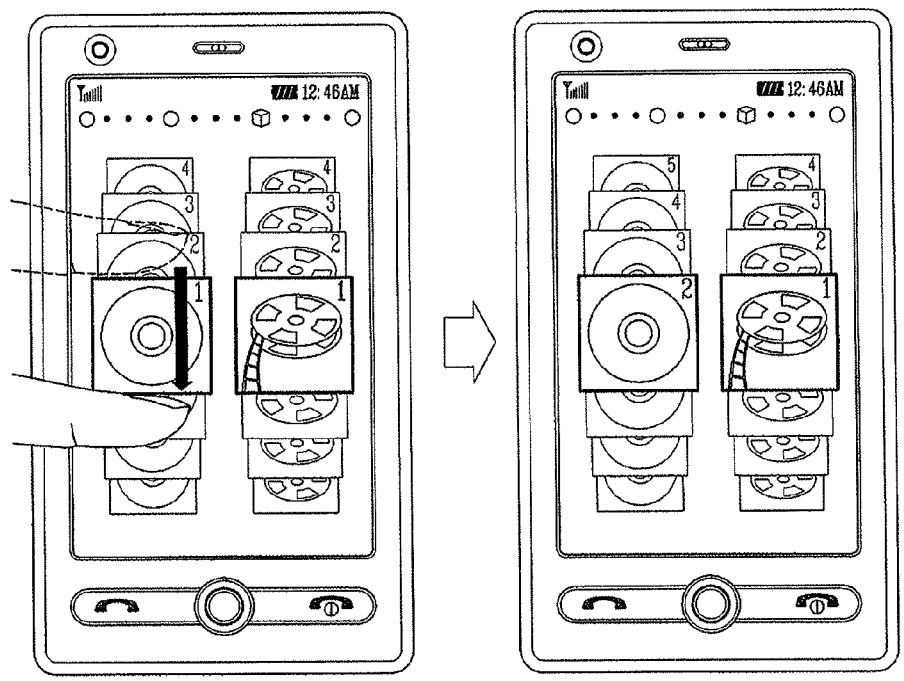
FIGS. 9A-9C are overviews of display screens illustrating a method for controlling an information list of a mobile terminal according to an embodiment of the present invention.
Figure 9B:
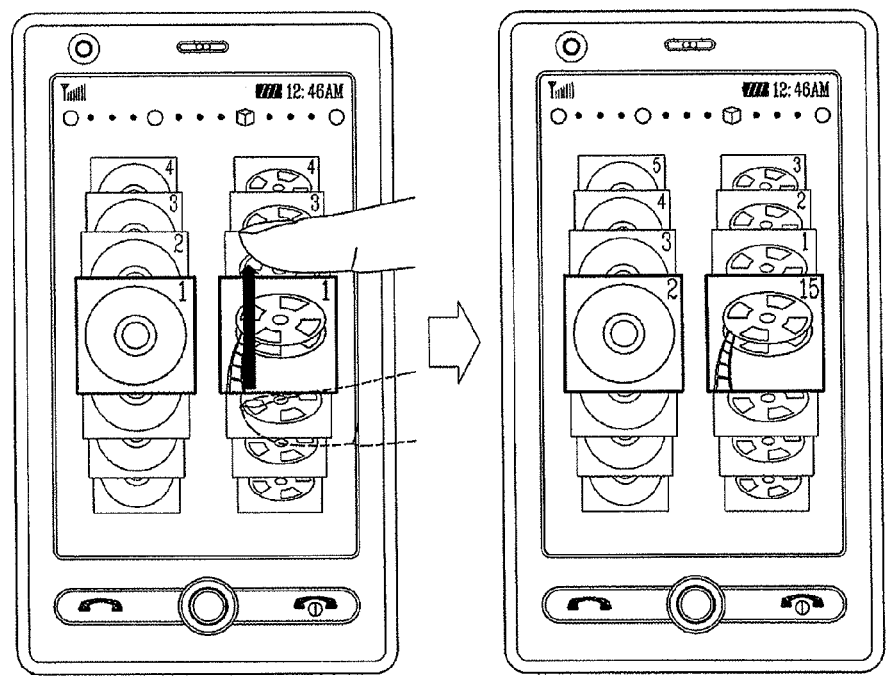
Figure 9C:
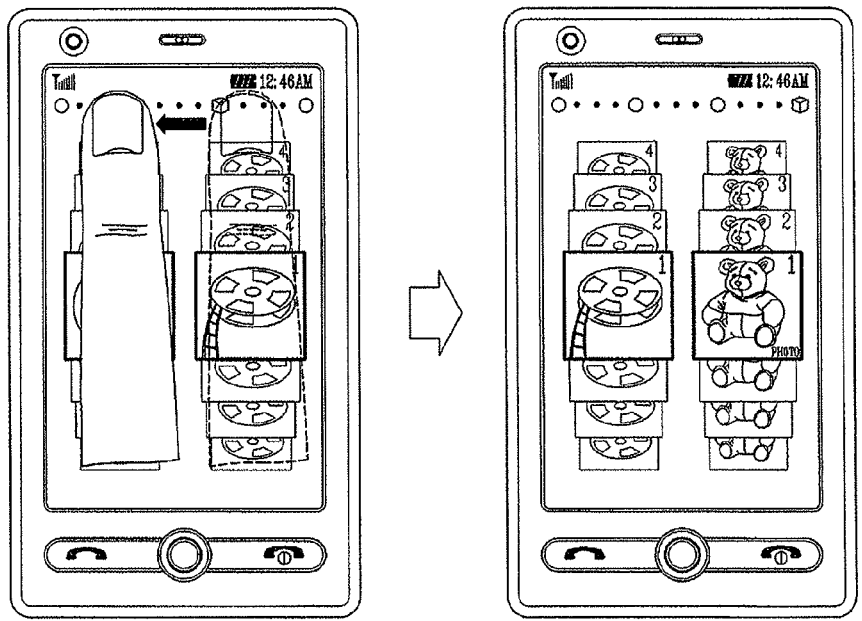

FIGS. 9A-9C are overviews of display screens illustrating a method for controlling an information list of a mobile terminal according to one embodiment of the present invention. First, when the multimedia storage box is selected by the user, the controller 180 classifies the multimedia information or files stored in the multimedia storage box by the categories and displays the classified information list of each category in parallel. In addition, in the mobile terminal according to an embodiment of the present invention, a horizontal scroll unit can be displayed at the first display region A1, a music list can displayed at the second display region A2, and a video list can displayed at the third display region A3.

Further, as shown in FIGS. 9A-9C, the music and video lists are displayed in parallel. Thus, as shown, when the user's finger touches or closes to a particular point of the display screen, the sensing unit 140 detects it and informs the controller 180. The controller 180 then checks the detected input type, and if the input type is one of a touch drag, a proximity drag and flicking operation, the controller 180 rolls the corresponding information lists according to the detected input. Further, the controller 180 can adjust a rolling direction of the information lists according to a drag and flicking direction, and determine a rolling distance or movement speed of the information lists or the amount of movement of the information list. Namely, the controller 180 can adjust the number of items that pass by the focus (F). In addition, the controller 180 can adjust the rolling speed of the information lists according to the drag speed.

As shown in FIG. 9A, when the user's finger performs a dragging operation on the music lost, the controller 180 rolls the music list. Further, the controller 180 rolls the music information or items displayed at the top in the drag direction to roll it back by one step. Accordingly, music information positioned up behind by one step the music information displayed at the top is rolled in the drag direction, stopped at the focus (F) and displayed at the uppermost portion. Note that the video information is not scrolled. Thus, the controller 180 individually controls the operations of the different lists. As shown in FIG. 9B, when the user's finger performs a dragging operation on the video list, the controller 180 rolls the items of the video list based on the drag direction, distance and speed. In this manner, the mobile terminal 100 can display the two different groups of information lists in parallel and separately control the displayed information lists.

As shown in FIG. 9C, when the user's finger performs a dragging operation on the first display region A1, the controller 180 detects it via the sensing unit 140 and rolls the information list overall in a horizontal direction based on the drag direction and distance. For example, when the dragging operation is performed from a first point to a second point as illustrated in FIG. 9C, the controller 180 rolls the music list to outside the screen making it disappear, and rolls the video list to the second display region A2 on which the music list was displayed. In addition, the controller 180 rolls a hidden photo list to the third display region A3 to display it. In this instance, the controller 180 individually controls the video information list to move to the left, controls the music list to move to the left and disappear from the screen, and adds a new list of pictures.

Figure 10:
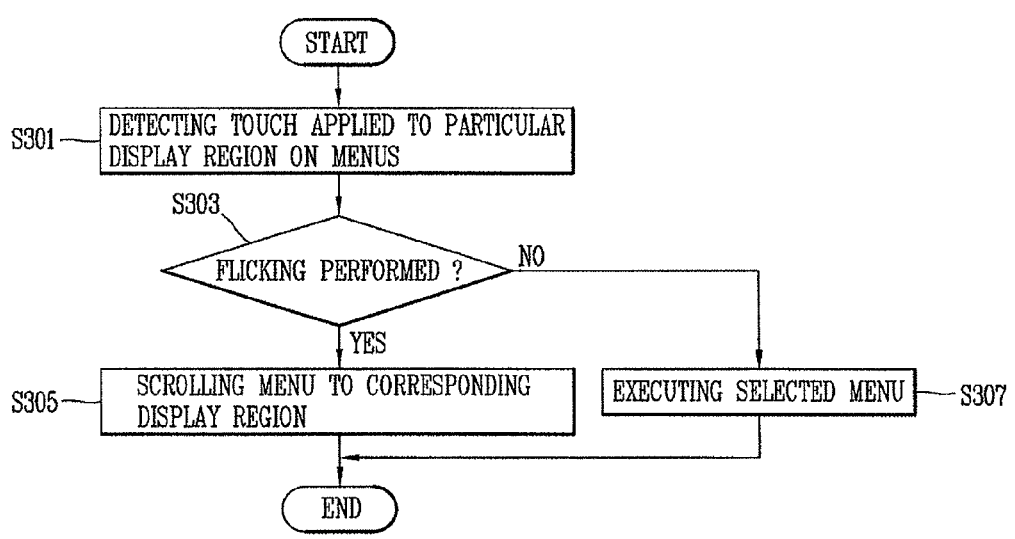
FIG. 10 is a flow chart illustrating a method for controlling an information list of a mobile terminal according to another embodiment of the present invention.

Next, FIG. 10 is a flow chart illustrating a method for controlling an information list of a mobile terminal according to another embodiment of the present invention. In this embodiment, a menu list is controlled in a state that menus are displayed in a grouping form.

First, when a pointer such as user's finger touches a menu displayed on the display screen, the sensing unit 140 detects it and transmits a sensing signal to the controller 180 (S301). Upon receiving the sensing signal, the controller 180 checks whether or not a flicking operation has been performed through the sensing signal transmitted from the sensing unit 140 (S303). If a flicking operation has been performed (Yes in S303), the controller 180 scrolls a menu displayed at a row corresponding to the touch-detected position along the flicking direction (S305). Further, whenever a flicking operation is detected, the controller 180 scrolls the menu by the pre-set amount of scrolling, and the amount of scrolling can be set by the user or be set as default.

If the touch input is a contact touch in step 303, the controller 180 executes a particular function selected by the touch input (S307). In this embodiment, the items displayed at the particular row are scrolled according to the flicking operation is taken as an example, but it may be implemented such that items displayed at the particular row are scrolled according to a dragging operation. Also, the mobile terminal according to the present invention may adjust the amount and speed of scrolling based on the drag distance and speed.

Figure 11:
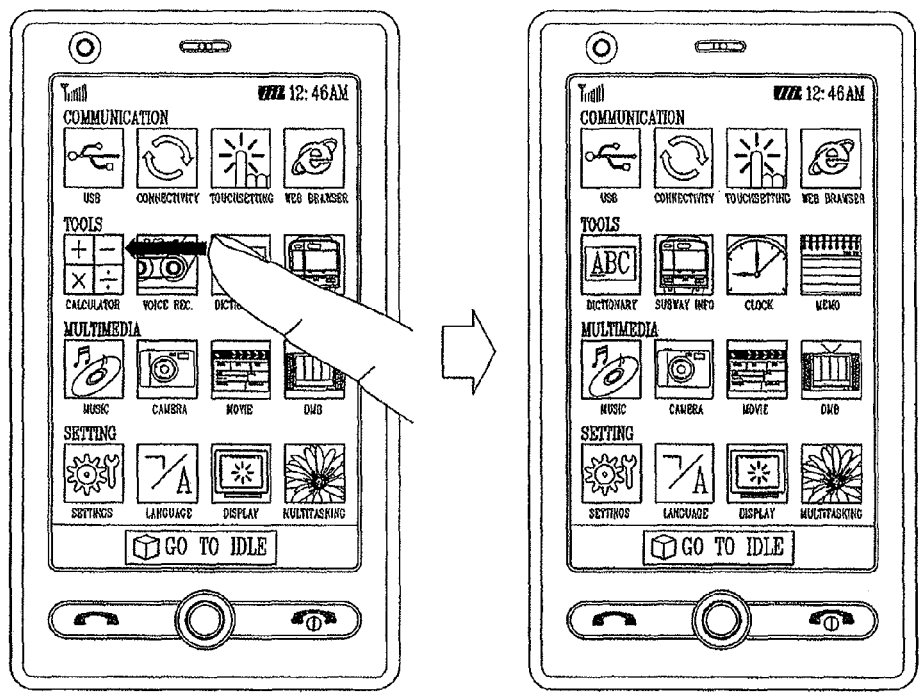
FIG. 11 is an overview of display screens of a mobile terminal performing the embodiment of FIG. 10.

Next, FIG. 11 is an overview of display screens of a mobile terminal performing the embodiment of FIG. 10. As shown in FIG. 11, grouped menu items are arranged and displayed by rows on the display screen of the mobile terminal 100. With the menu items displayed, and when a touch applied to a region of a particular group is detected, the controller 180 detects the touch via the sensing unit 140 and checks whether the touch detected by the sensing unit 140 is a flicking operation. If the detected touch is the flicking operation, the controller 180 scrolls the items displayed at the touch-detected region along the flicking direction. Note that the other lists are not scrolled.

For example, as shown in FIG. 11, if the flicking operation is performed in one direction at the second row, the controller 180 rolls the items displayed at the second row based on the flicking direction. Further, the controller 180 rolls the items displayed at the corresponding second row according to the detected flicking operation, and if the flicking operation is detected still after the last item comes onto the display screen, the controller 180 can display a first item following the last item.

Figure 12:
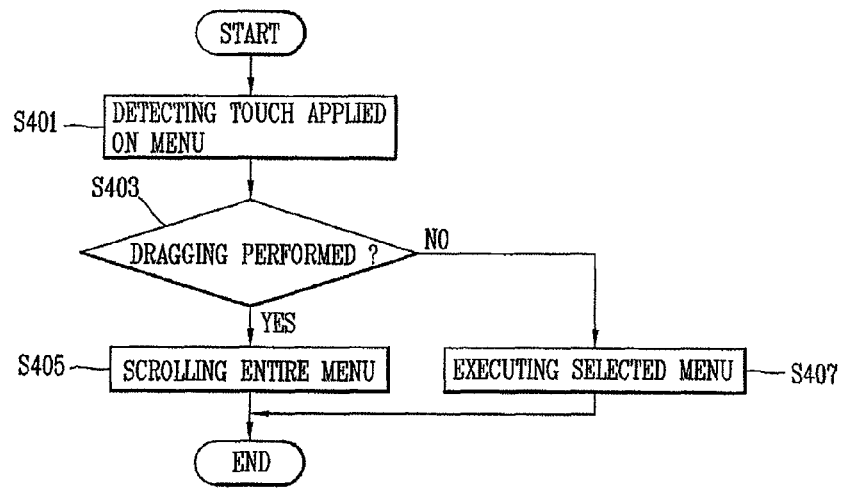
FIG. 12 is a flow chart illustrating a method for controlling an information list of a mobile terminal according to still another embodiment of the present invention.

FIG. 12 is a flow chart illustrating a method for controlling an information list of a mobile terminal according to still another embodiment of the present invention. With reference to FIG. 12, when a touch is applied to the display screen with menus displayed thereon, the controller 180 detects the touch via the sensing unit 140 (S401).

As the touch is detected, the controller 180 checks whether the touch input is a dragging operation (S403). If the touch is maintained and moved by more than a reference distance, the controller 180 recognizes that a dragging operation has been performed. Then, with the dragging recognized, the controller 180 simultaneously scrolls the times of entire groups displayed on the display screen (S405). In addition, the controller 180 can detect a distance, direction and speed of the dragging operation via the sensing unit 140 and adjust the amount, direction and speed of scrolling based on the detected distance, direction and speed of the dragging operation. Meanwhile, if the touch input is a contact touch in step S403, the controller 180 executes a menu corresponding to the touch-detected point (S407).

Figure 13:
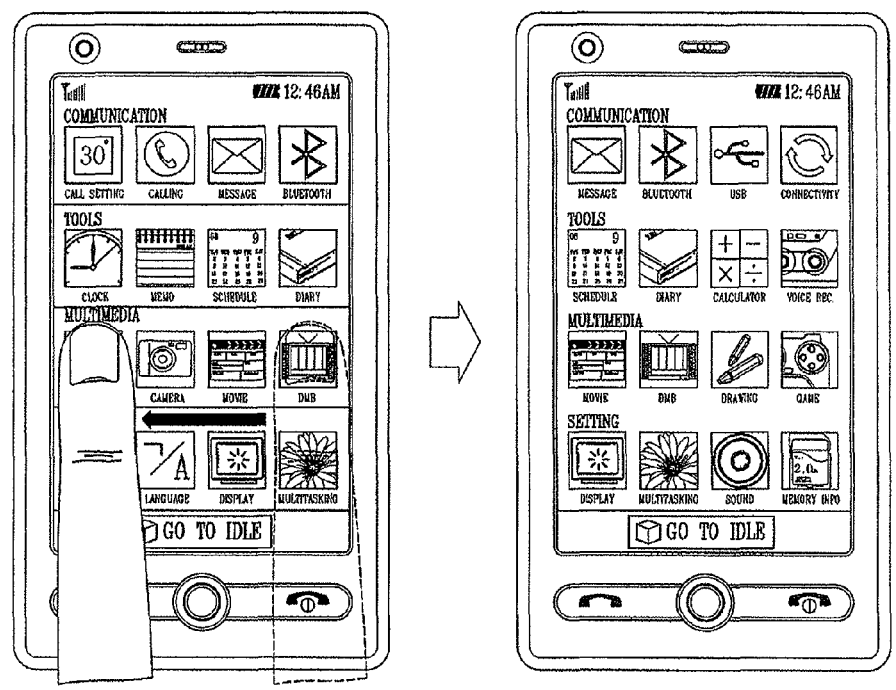
FIG. 13 is an overview of display screens of a mobile terminal performing the embodiment of FIG. 12.

Next, FIG. 13 is an overview of display screens of a mobile terminal performing the embodiment of FIG. 12. As shown in FIG. 13, when a menu key is selected by a user input, the controller 180 discriminates groups vertically and arranges and displays menu items of each group horizontally. Thereafter, when a touch drag operation is detected on a particular region of the display screen, the controller 10 detects a distance, direction and speed of the dragging operation via the sensing unit 140. The controller 180 also scrolls the entire menu items displayed on the display screen based on the detected distance, direction and speed of the dragging operation. For example, the controller 180 can roll all the menu items displayed at the first to fourth rows in the drag direction by the drag distance. In this example, the controller 180 individual controls each list to scroll together (e.g., the controller 180 locks the displayed lists together so they scroll together based on the user selecting the appropriate menu key).

Figure 14A:
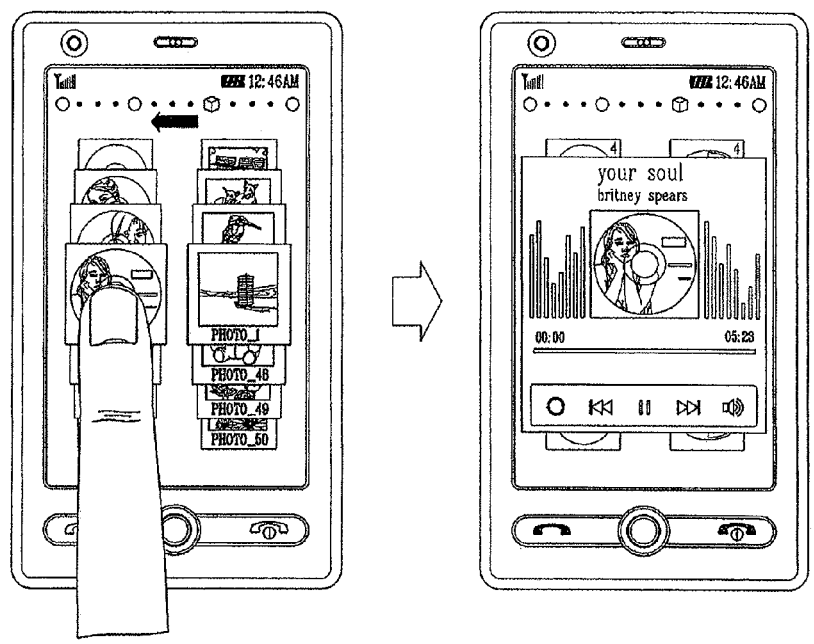
FIGS. 14A to 14C are overviews of display screens illustrating information selected from an information list of a mobile terminal according to an embodiment of the present invention.
Figure 14B:
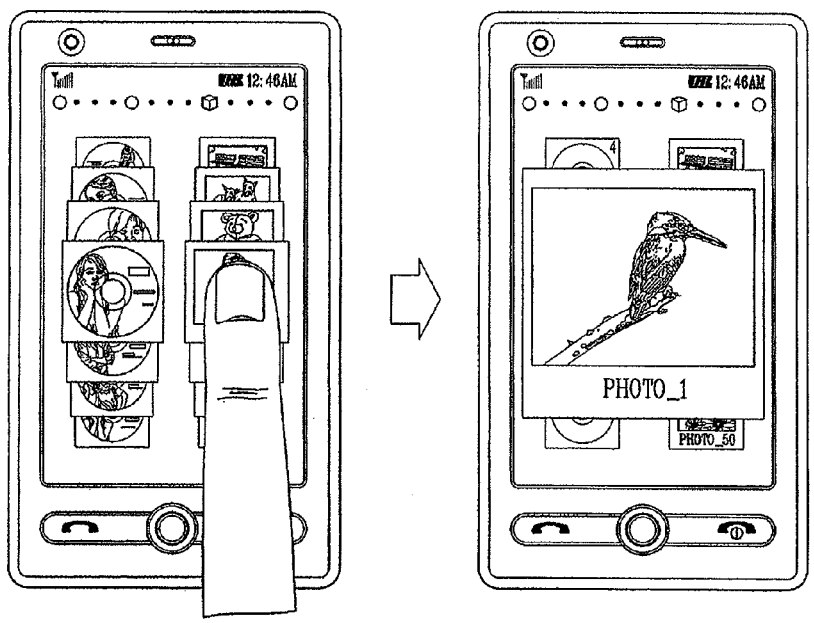
Figure 14C:
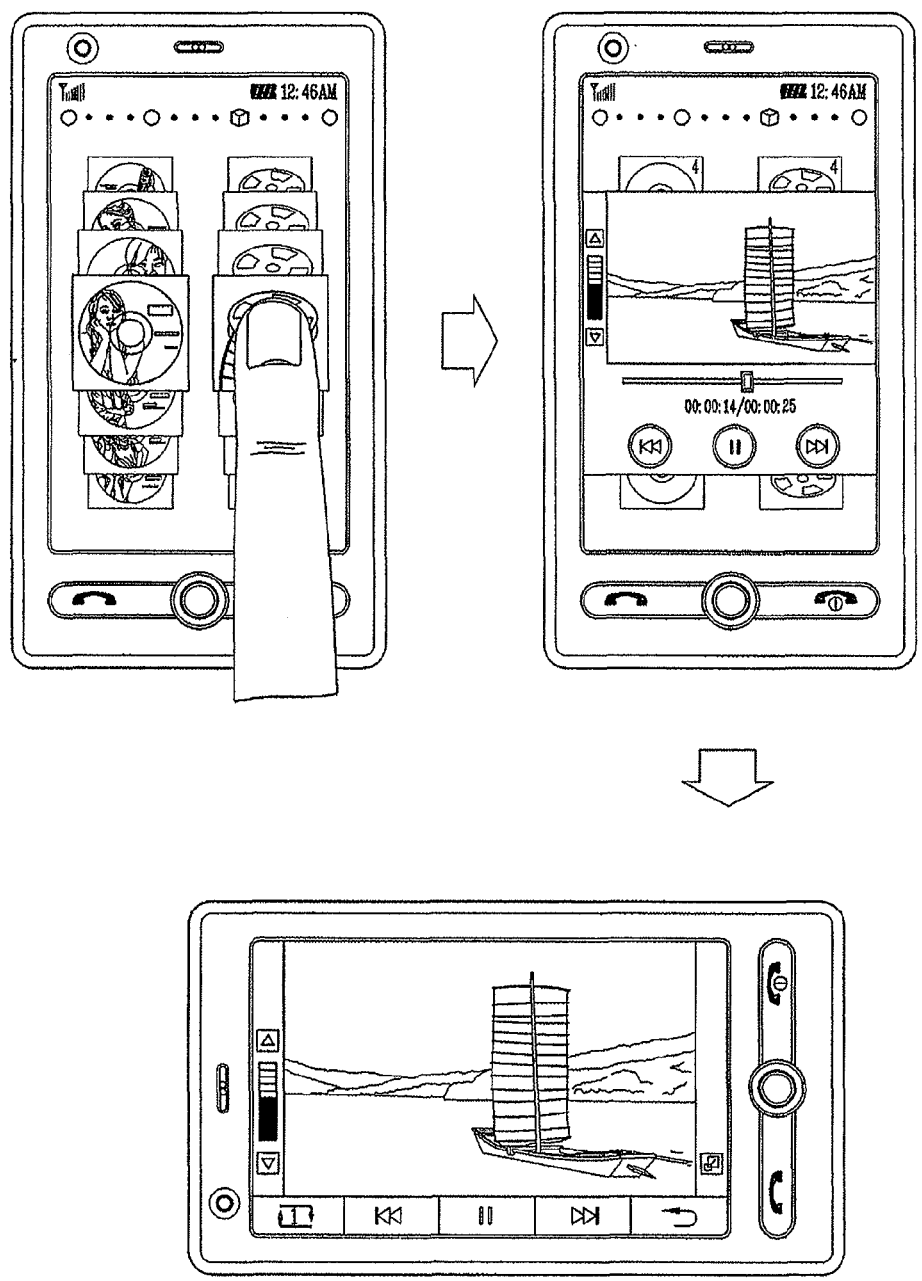

FIGS. 14A to 14C are overviews of display screens illustrating information selected from an information list of a mobile terminal according to an embodiment of the present invention. As shown in FIG. 14A, when one of music files on the list is selected, the mobile terminal 100 executes the multimedia player to reproduce the selected music file. At this time, the controller 180 displays features for controlling the operation of the multimedia player and information related to the music file, a music reproduction status bar, and the like. The displayed features includes a reproduction button, a stop button, a repetition button, a next music button, a previous music button, and the like, and the music-related information includes information such as an album jacket image, the title of music, a singer, album information, etc.

With reference to FIG. 14B, with the music files and multimedia (video and photo) files displayed in parallel on the screen, and when the user selects one of photo files, the controller 180 displays the selected photo file on the display screen. Here, the controller 180 can display the selected photo in a pop-up manner and display information related to the photo file such as a file name, its order, and the like. With reference to FIG. 14C, when desired information is selected while the user is reading information stored in the terminal, the controller 180 reproduces the selected information and displays it on the screen of the display 151. For example, if a desired video is selected by a contact touch operation while the user is reading a list of videos stored in the terminal, the controller 180 reads the selected video file from the memory 160 and reproduces the same. Here, the controller 180 can output the video reproduction image in a pop-up or overlaying manner as shown and also display a control icon to control the video reproduction. In addition, if there is no input to the control icon until a certain time lapses, the controller 180 can make the control icon disappear.

Further, when a placed state of the terminal is changed from a portrait orientation (vertical view) to a landscape orientation (horizontal view), namely, when the terminal is rotated by 90° in one direction, the controller 180 detects the rotation via the sensing unit 140 and rotates and displays the video reproduction screen image based on the detected placed state of the terminal. In addition, the controller 180 can display the video reproduction image on the entire screen of the display 151.

Figure 15:
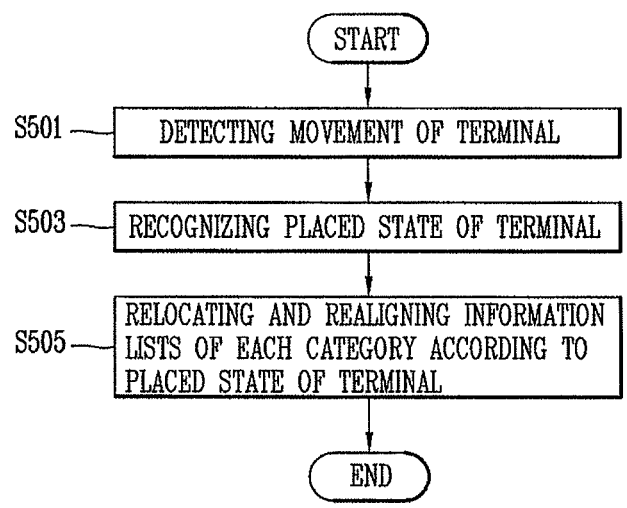
FIG. 15 is a flow chart a flow chart illustrating a method for displaying an information list of a mobile terminal according to still another embodiment of the present invention.

Next, FIG. 15 is a flow chart illustrating a method for displaying an information list of a mobile terminal according to still another embodiment of the present invention. First, the sensing unit 140 can detect a movement of the terminal by using an acceleration sensor and/or tilt sensor (S501). When a movement of the terminal is detected, the controller 180 recognizes a placed state of the terminal based on a sensing signal generated from the sensing unit 140 (S503). Here, the placed state of the terminal may include a landscape orientation and a portrait orientation. For example, the landscape orientation refers to a state in which the display screen is viewed widely in a horizontal direction in view of the user, and the portrait orientation refers to a state in which the display screen is viewed widely in a vertical direction in view of the user. In other words, when the ratio of the display screen (the width-to-length ratio) is A:B, the landscape orientation refers to a state that the width (A) of the screen is larger than the length (B), and the portrait orientation refers to state that the width (A) of the screen is smaller than the length (B).

When the placed state of the terminal is changed from the portrait orientation to the landscape orientation, the controller 180 can relocate and/or realign and display the information lists of each category (S505). Here, when the placed state of the terminal is changed from the portrait orientation to the landscape orientation (or vice-versa), the controller 180 classifies information by departmentalizing categories and displays the classified information lists in parallel. Namely, the controller 180 departmentalizes categories classified by image and music into photo, video, music, record files, and the like.

Figure 16:
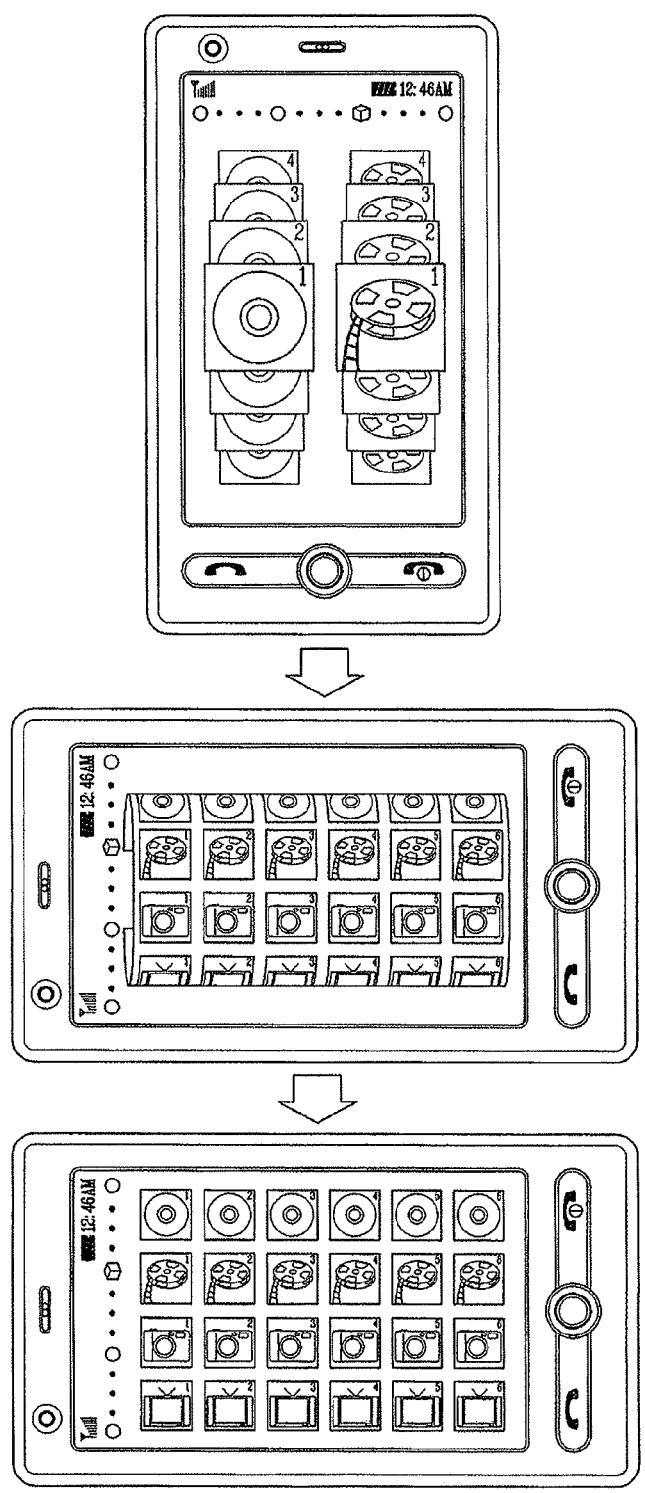
FIG. 16 is an overview of display screens illustrating information lists displayed based on a placed position of a mobile terminal according to one embodiment of the present invention.

FIG. 16 is an overview of display screens illustrating information lists displayed based on a placed position of the mobile terminal according to one embodiment of the present invention. As shown in FIG. 16, the sensing unit 140 can detect a movement of the terminal by using the acceleration sensor and/or tilt sensor. If a placed state of the terminal detected by the sensing unit 140 is the portrait orientation, the controller 180 displays information lists of two different groups (categories) in parallel in a vertical direction.

Thereafter, when the placed state of the terminal is changed from the portrait orientation to the landscape orientation (rotated by 90° counterclockwise), the controller 180 detects the change via the sensing unit 140 and changes the screen configuration of the display unit 151. The controller 180 also displays information lists of each group according to the changed screen configuration. Namely, when the placed state of the terminal is changed to the landscape orientation, the controller 180 makes information lists of other groups, which have been hidden (not displayed), appear on the screen and arranges and displays the information lists of each group in parallel along the horizontal direction. At this time, as illustrated, the controller 180 can display the information lists of each group such that they are unfolded like rolled paper, to thereby provide an enhanced visual effect to the user.

Figure 17A:
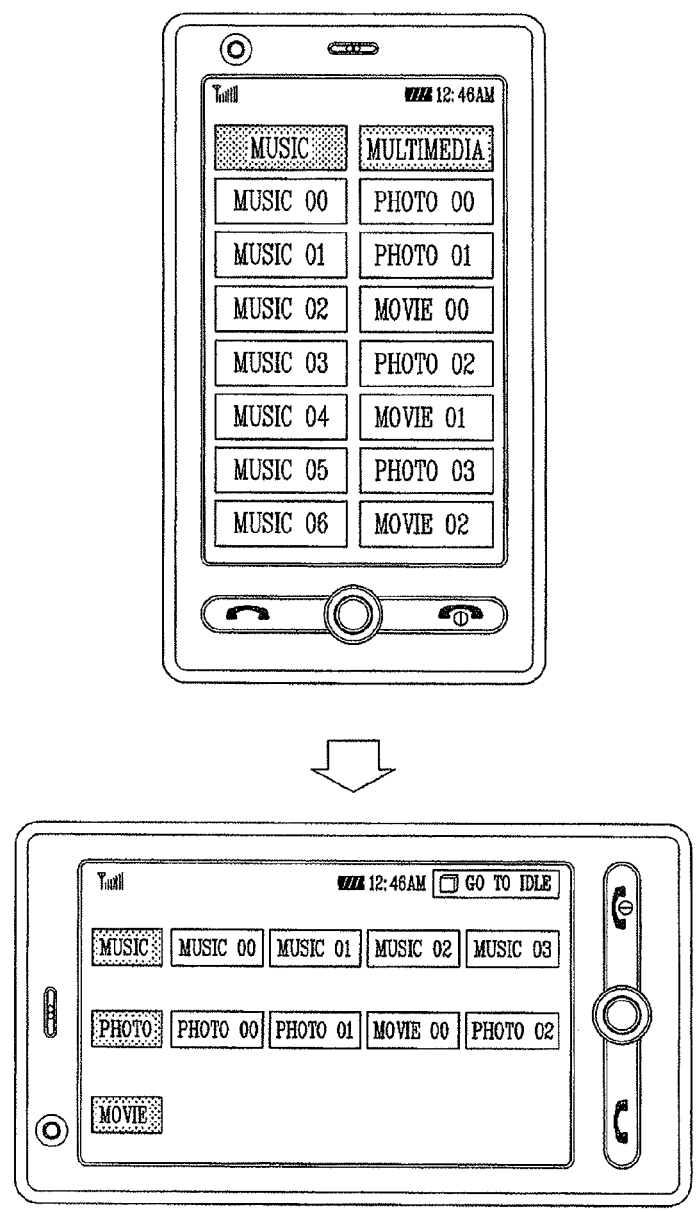
FIGS. 17A and 17B are overviews of display screens illustrating information lists displayed based on a placed position of a mobile terminal according to another embodiment of the present invention.
Figure 17B:
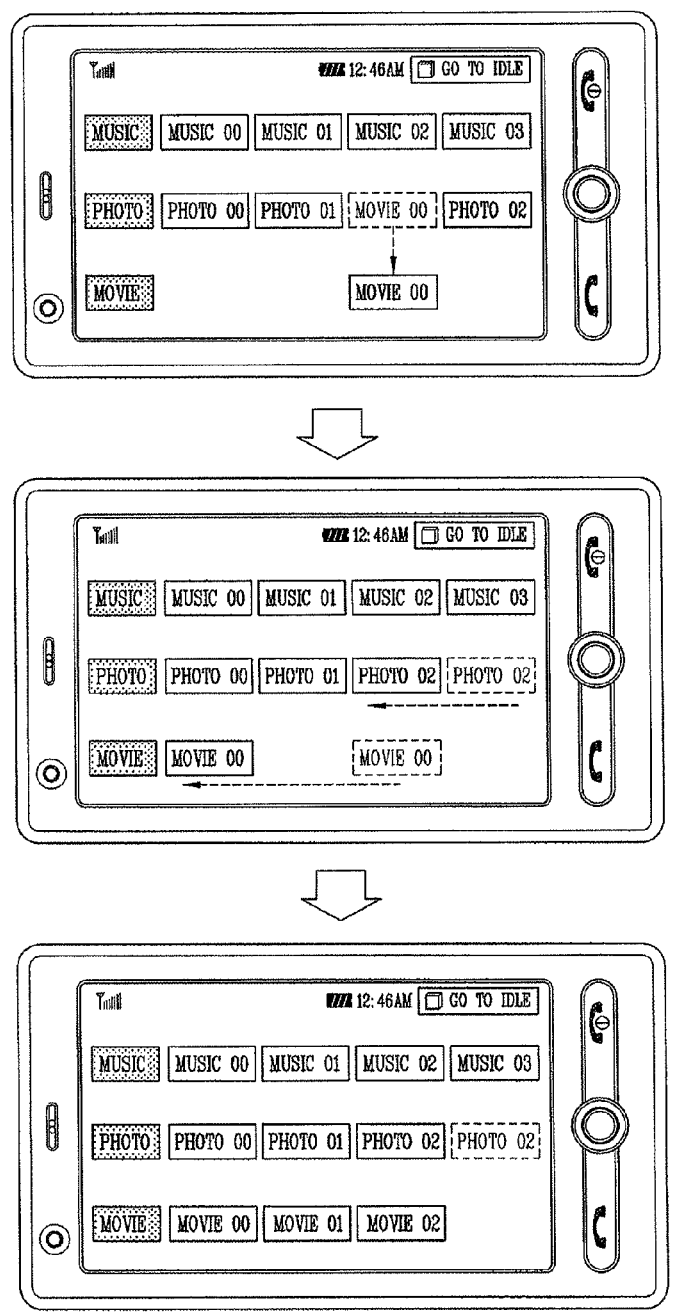

Next, FIGS. 17A and 17B are overviews of display screens illustrating information lists displayed based on a placed position of a mobile terminal according to another embodiment of the present invention. As shown in FIG. 17A, when the user goes to a submenu according to menu manipulation by the user, the controller 180 vertically arranges and displays items belonging to each submenu. Namely, if a placed state of the terminal is the portrait orientation, the controller 180 divides into two display regions in the vertical direction and arranges and displays corresponding group items at each display region.

Thereafter, when the terminal is rotated by 90° counterclockwise, the controller 180 detects the rotation via the sensing unit 140 and recognizes a placed state of the terminal. Upon recognition the state of the terminal, and if the placed state of the terminal is changed from the portrait orientation to the landscape orientation, the controller 180 changes the configuration of the display screen and displays the information lists according to the changed screen configuration. If a placed state of the terminal is the landscape orientation, the controller 180 divides the display screen into three display regions in the horizontal direction and arranges and displays information lists (items) at each divided display region. In this instance, the controller 180 classifies fragmentation-available group into subgroups. Namely, as shown in FIG. 17A, the controller 180 classifies the 'multimedia' group into subgroups of 'photo' and 'movie'.

In addition, the controller 180 classifies objects belonging to the 'multimedia' group into 'photo' and 'movie' according to the object types. Namely, the controller 180 discriminately classifies the objects into photo files and video files. The controller 180 also moves the classified objects to the corresponding subgroups. For example, as shown in FIG. 17B, the controller 180 moves from the 'photo' group to the 'movie' group with an effect that the video files fall downward, and aligns the moved files with an effect that the moving path is visually displayed.

Figure 18:
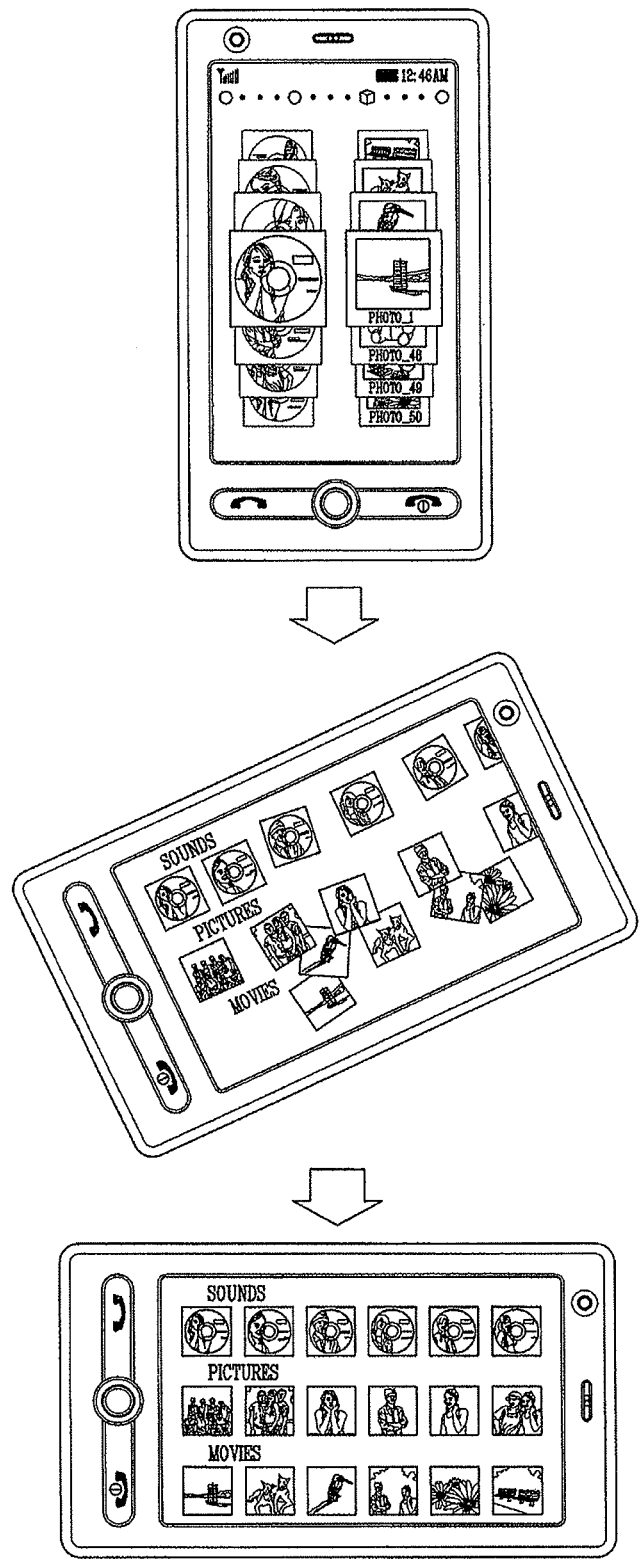
FIG. 18 is an overview of display screens illustrating information lists displayed based on a placed position of a mobile terminal according to still another embodiment of the present invention.

Next, FIG. 18 is an overview of display screens illustrating information lists displayed based on a placed position of a mobile terminal according to still another embodiment of the present invention. First, the controller 180 detects a placed state of the terminal via the sensing unit 140. If the placed state of the terminal is the portrait orientation, the controller 180 classifies information stored in the memory 160 into two categories (e.g., music and image) and displays them in parallel. In addition, sub-items of each category are displayed in parallel as shown in FIG. 18. For example, a music list is displayed at one row and an image (e.g., video, photo) list is displayed at another row.

Further, in a state that item lists of each category are displayed in parallel, and when the user inclines the terminal, the controller 180 detects the movement of the terminal via the sensing unit 140. When the terminal is inclined at more than a certain angle, the controller 180 checks whether there is a category that can be departmentalized. If there is a category that can be departmentalized, the controller 180 departmentalizes the corresponding category into two or more subcategories. Namely, when the terminal is changed from the portrait orientation to the landscape orientation, one or more categories may be added, and the added categories may be one of the subcategories of the category displayed in the portrait orientation.

The controller 180 can also provide an effect that items corresponding to the added category fall downward in a gravity-working direction (i.e., in the ground direction). For example, when the terminal is positioned as the portrait orientation, music and image categories are classified and displayed, and when the terminal is rotated to change to the landscape orientation, the controller 180 departmentalizes the image category into pictures and movies. The controller 180 also aligns the items of each category by providing an effect that only the items belonging to the video category fall down in the ground direction.

If the placed state of the terminal is changed from the portrait orientation to the landscape orientation and again to the portrait orientation, the falling items (e.g., files) are returned to their original positions. In addition, the category arrangement order or the order of arranging items of each category may be changed according to the direction in which the terminal is rotated.

FIG. 19 is an overview of display screens illustrating information lists displayed based on a placed position of a mobile terminal according to yet another embodiment of the present invention. With reference to FIG. 19, the mobile terminal 100 can detect a movement of the terminal via the sensing unit 140. If a detected placed state of the terminal is the portrait orientation, the controller 180 divides the display region of the display screen horizontally by the number of groups, and arranges and displays menu items (objects) of each group at the divided display regions. Further, the controller 180 displays the group name (e.g., category, title, main menu name) at a fixed position of the first display region, and displays an icon list scrolled in one direction according to an external input. In this instance, the controller 180 can display menu names corresponding to icons.

Thereafter, when the placed state of the terminal is changed to the landscape orientation, the controller 180 detects the movement of the terminal via the sensing unit 140 and changes the menu display according to the detected placed state of the terminal. Namely, when the placed state of the mobile terminal is changed from the portrait orientation to the landscape orientation, the controller 180 rotates the menu screen image displayed on the display screen by 90° overall to display the same. In this instance, the menu screen image is rotated in the opposite direction to the rotation direction of the terminal. In addition, the controller 180 adjusts the number of objects displayed by the groups and does not display the menu name corresponding to icons.

Figure 20:
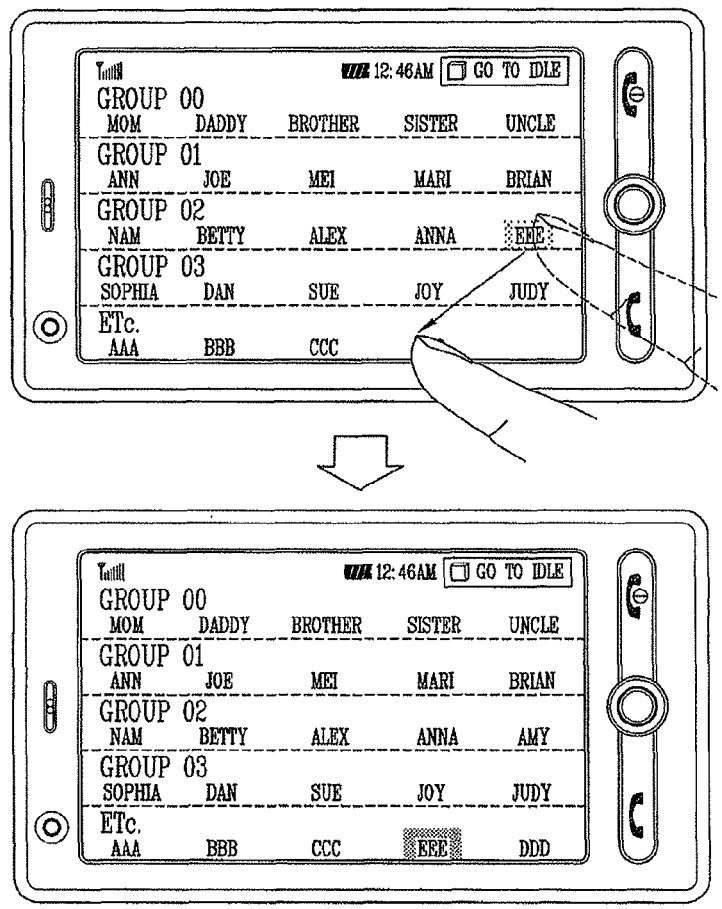
FIG. 20 is an overview of display screens illustrating movement of information between information lists on a mobile terminal according to an embodiment of the present invention.

Next, FIG. 20 is an overview of display screens illustrating a movement of information between information lists on the mobile terminal according to an embodiment of the present invention. In more detail, when the user executes a phone book function through menu manipulation, the controller 180 arranges and displays objects registered by groups as shown in FIG. 20. With the phone book lists discriminately displayed by groups, and when the user moves one of the displayed objects to another group through a dragging operation, the controller 180 detects the object movement by the dragging operation via the sensing unit 140, and includes the object in a different group and aligns it.

As described above, the mobile terminal according to embodiments of the present invention can display the information lists classified by the groups in parallel. In addition, the information lists of each category can be selectively controlled based on a touch and proximity action. Namely, the information lists can be separately (e.g., independently) controlled by the groups. Moreover, the because the menus are arranged and displayed in parallel by discriminating them by the categories, the user can move to the submenus without passing through the top menus, making the depth of accessing a particular menu shallower, and thus the menu accessibility is improved.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of transmission via the Internet. The computer may include the controller 180 of the terminal.

Further, the mobile terminal according to the embodiments of the present invention is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a memory unit configured to store data;
a display unit including a touch screen and configured to display the stored data;
a sensing unit configured to detect an orientation of the mobile terminal; and
a controller configured to:
classify the stored data into at least a first category of data and a second category of data, the first category of data further classified into at least two subcategories of data and the second category of data not further classified into multiple subcategories of data;
control the display unit to display the first category of data in a first list parallel to the second category of data in a second list when the mobile terminal is in a first orientation;
control the first list and the second list based on a touching action performed on the first list and the second list; and
when the detected orientation changes from the first orientation to a second orientation, control the display unit to display the at least two subcategories of data in a first subcategory list and a second subcategory list parallel to the first subcategory list in place of the first category of data in the first list and display the second category of data in the second list parallel to the first and second subcategory lists,
wherein first subcategory data included in the first category of data is moved and aligned into the first subcategory list and second subcategory data included in the first category of data is moved and aligned into the second subcategory list, when the detected orientation changes from the first orientation to the second orientation.

2. The mobile terminal of claim 1, wherein the stored data includes at least two groups of music files, video files, picture files, and menu options available on the mobile terminal.

3. The mobile terminal of claim 1, wherein the controller is further configured to receive a scrolling command requesting the list of the first category of data be scrolled, and
wherein the scrolling command includes one of a touch-flicking operation, a touch-and-drag operation and a proximity touch operation performed on the touch screen of the display unit.

4. The mobile terminal of claim 3, wherein the controller is further configured to control the display unit to roll the list of the first category of data based on the received scrolling command.

5. The mobile terminal of claim 4, wherein the controller is further configured to roll the list of the first category of data in a certain direction and a certain amount to correspond with at least one of a direction and speed of the received scrolling command.

6. The mobile terminal of claim 1, wherein the controller is further configured to:
receive a selection signal indicating a selection of one of the data including in the list of the first category, and
control the display unit to display the selected one of the data as a full-size image on an entire screen of the display unit.

7. The mobile terminal of claim 6, wherein the controller is further configured to control the display unit to first display the selection one of the data in the pop-up or overlaying manner, and then to display the selected one of the data as the full-size image on the entire screen of the display unit when the mobile terminal is rotated from the first orientation to the second orientation.

8. The mobile terminal of claim 1, wherein the data are files and displayed as thumbnail images.

9. A method of controlling a mobile terminal, the method comprising:
displaying, via a display unit including a touch screen, data stored in a memory associated with the mobile terminal;
classifying, via a controller of the mobile terminal, the requested stored data into at least a first category of data and a second category of data, the first category of data further classified into at least two subcategories of data and the second category of data not further classified into multiple subcategories of data;
displaying, on the display unit, the first category of data in a first list parallel to the second category of data in a second list when the mobile terminal is in a first orientation;
controlling the first list and the second list based on a touching action performed on the first list and the second list; and
when an orientation of the mobile terminal detected by a sensing unit of the mobile terminal changes from the first orientation to a second orientation, displaying the at least two subcategories of data in a first subcategory list and a second subcategory list parallel to the first subcategory list in place of the first category of data in the first list and display the second category of data in the second list parallel to the first and second subcategory lists,
wherein first subcategory data included in the first category of data is moved and aligned into the first subcategory list and second subcategory data included in the first category of data is moved and aligned into the second subcategory list, when the detected orientation changes from the first orientation to the second orientation.

10. The method of claim 9, wherein the stored data includes at least two groups of music files, video files, picture files, and menu options available on the mobile terminal.

11. The method of claim 9, further comprising:
receiving a scrolling command requesting the list be scrolled,
wherein the scrolling command includes one of a touch-flicking operation, a touch-and-drag operation and a proximity touch operation performed on the touch screen of the display unit.

12. The method of claim 11, wherein when the receiving step receives the scrolling command, the controlling step controls the display unit to separately roll the list.

13. The method of claim 12, wherein the controlling step controls the display unit roll the list in a certain direction and a certain amount to correspond with at least one of a direction and speed of the received scrolling command.

14. The method of claim 12, wherein the data are files, and further comprising displaying the files as thumbnail images.

15. The method of claim 9, further comprising:
receiving a selection signal indicating a selection of one of the data including in the list; and
displaying the selected one of the data as a full-size image on an entire screen of the display unit.

16. The method of claim 15, wherein the controlling step controls the display unit to first display the selection one of the data in the pop-up or overlaying manner, and then to display the selected one of the data as the full-size image on the entire screen of the display unit when the mobile terminal is rotated from the first orientation to the second orientation.

* * * * *